United States Patent Office 2,808,904
Patented Oct. 8, 1957

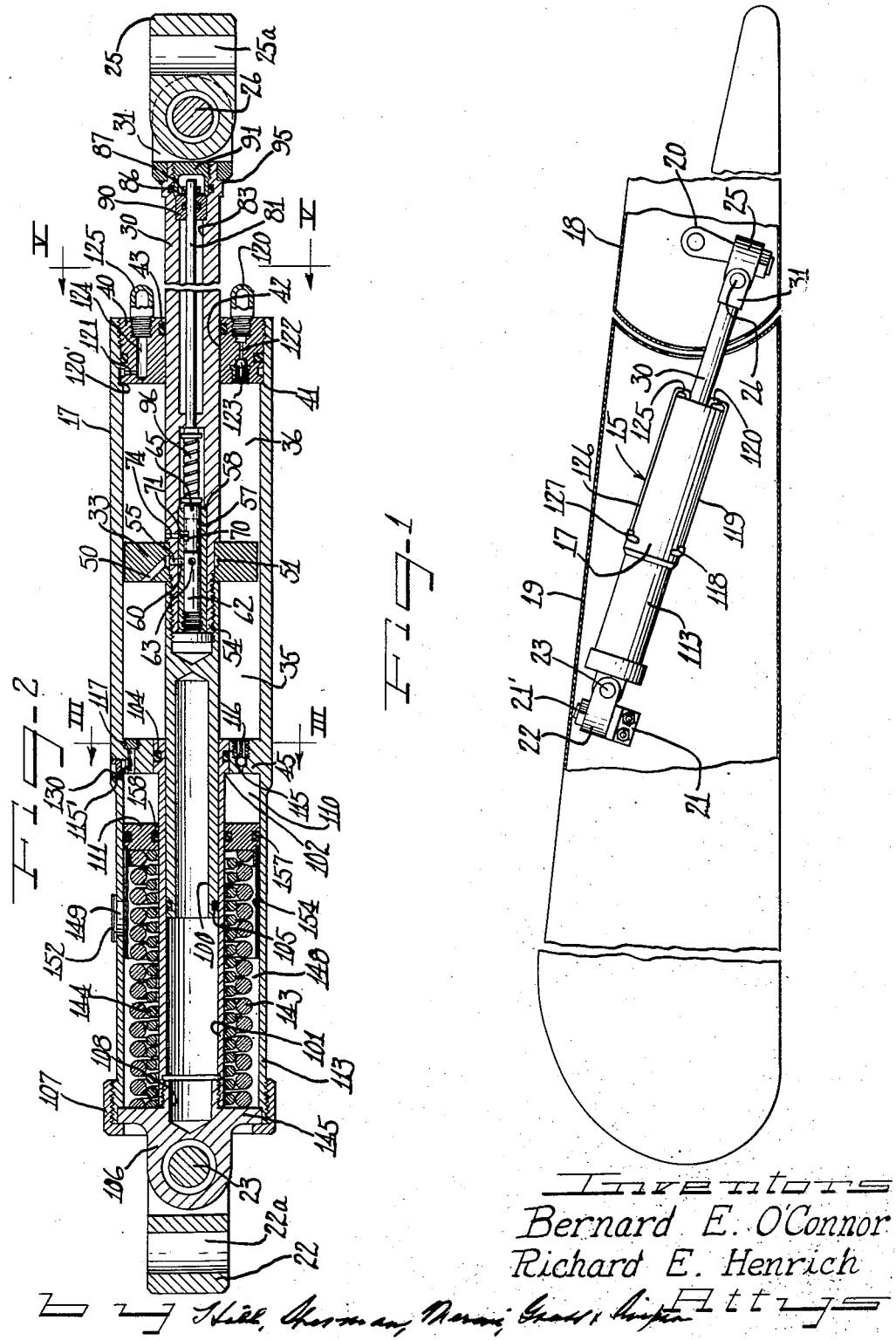

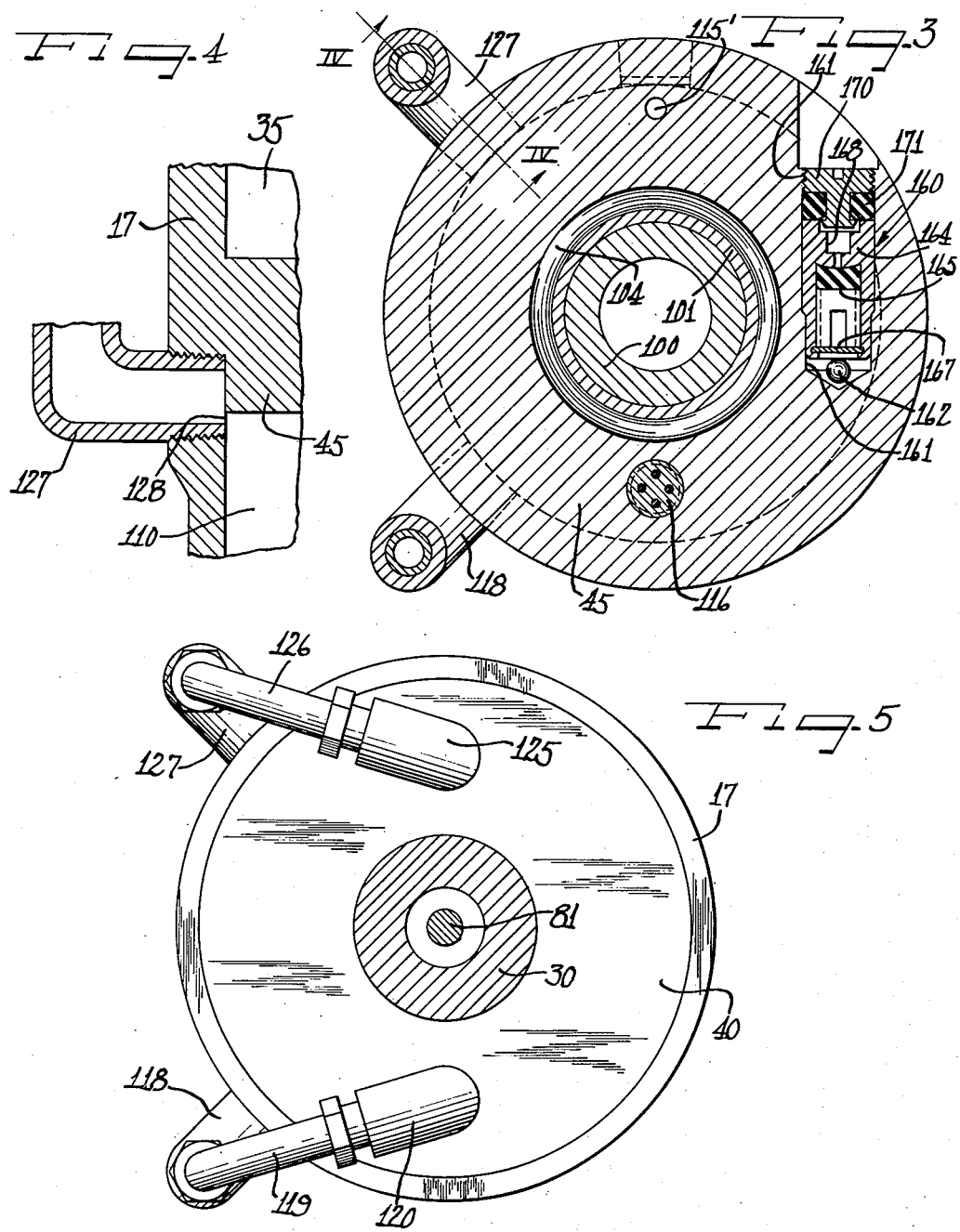

2,808,904

FLUTTER DAMPER WITH AIR BLEED

Bernard E. O'Connor, Lake View, N. Y., and Richard E. Henrich, Detroit, Mich., assignors to Houdaille Industries, Inc., a corporation of Michigan Application August 18, 1954, Serial No. 450,609

2 Claims. (Cl. 188—96)

The present invention relates to improvements in flutter dampers for aircraft, and more particularly relates to dampers for eliminating flutter of pivotally adjustable stabilizer and airfoil attachments such as elevators, ailerons, wing flaps, and the like.

An important object of the present invention is to provide a hydraulic flutter damper structure operated by a linear piston movement rather than a rotary movement.

Another object of the invention is to provide a flutter damper operated by a linear piston action and having means for avoiding surges in the replenishing chamber due to variable piston rod displacements.

A further object of the present invention is to provide novel and improved replenishing and air bleeding systems for a flutter damper.

Still another object of the invention is to provide novel and improved means for applying pressure to fluid in the replenishing chamber of a flutter damper.

A still further object of the invention is to provide an improved flutter damper that is low in cost, simple to install and service, and dependable and reliable in operation.

Other objects, features and advantages of the present invention will be readily apparent from the following detailed description of a preferred embodiment thereof taken in conjunction with the accompanying drawings, in which:

Figure 1 is a fragmentary side elevational view of a vibration damper embodying features of the present invention and showing the same associated with mounting brackets and attached to relatively movable parts of an aircraft wing structure, shown more or less schematically with certain parts of the wing broken away and in section;

Figure 2 is a vertical longitudinal sectional view through the flutter damper of Figure 1;

Figure 3 is a transverse sectional detail view taken substantially along the section line III—III of Figure 2;

Figure 4 is a fragmentary enlarged longitudinal sectional view taken substantially along the line IV—IV of Figure 3; and Figure 5 is a transverse sectional detail view taken substantially along the line V—V of Figure 2.

A flutter damper 15, according to the present invention, comprises, as a principal component, a substantially elongated, preferably cylindrical and relatively small diameter casing or housing member 17 (Figures 1 and 2), extending across the joint between a movable control surface member 18 and an airplane airfoil assembly such as an elevator or wing 19. As is well known, the control surface member 18, which in a stabilizer assembly comprises an elevator, and in a wing assembly comprises an aileron, flap, or the like, is mounted to swing pivotally about an axis usually parallel to the edge of the airfoil body member 19, and for this purpose, is provided with hinges (not shown) housed within the joint structure between the body and the movable control member.

The elongated housing member 17 of the flutter damper is mounted between a lever 20 pivotal with the control member 18, for example about the axis of rotation of the control member, and a suitable bracket or the like indicated at 21 having a vertical pin 21' and secured with the airfoil body member 19. The casing or housing 17 is provided at its upper and forward end with a bracket 22 pivotal on a shaft 23 relative to the housing member 17 and having a vertical aperture 22a, Figure 2, receiving the vertical pin 21'. The bracket 22 is fixed relative to the pin 21' for securing the housing 17 against displacement while accommodating rocking movement of the housing in a vertical plane about the shaft 23. At its lower and rearward end, the flutter damper has a bracket 25 pivotally mounted by means of a shaft 26 and receiving the lever 20 by means of a vertical aperture 25a, Figure 2. Thus as the control member 18 tends to vibrate about its axis relative to the body member 19, the lever 20 will tend to axially shorten or elongate the flutter damper which axial reciprocal movement is resisted by the mechanism to be hereinafter described.

For transmitting the relative movement of the lever 20 to the damper, the damper is provided with a rearwardly and downwardly extending piston rod or stem 30 providing attachment ears 31 receiving the shaft 26. At the interior of the housing member 17, the piston rod 30 is connected with a piston member 33 which cooperates with the housing in defining a pair of working chambers 35 and 36. Axial vibration of the piston rod 30 and piston 33 is resisted by hydraulic fluid within the working chambers. Displacement of the piston 33 is accommodated by flow of hydraulic fluid between the working chambers, permitting relatively free intentional movements of the control structure; however, the flow of fluid is controlled in such a way as to resist sudden or rapid movements of the control structure. The piston 33 is of size to form a relatively loose fit with the interior wall of housing 17 so as to avoid undue friction therewith and to avoid locking of the piston due to expansion thereof under high temperature working conditions.

For defining a fixed wall of the working chamber 36, a plug 40 is threaded into the open lower end of the housing 17 and abuts against a shoulder 41 provided by the housing. The piston 30 reciprocates in an axial bore of the plug 40, with an O-ring 43 being provided to seal the working chamber 36. The opposite fixed wall of the working chamber 35 is provided by an internal flange 45 integral with the casing 17.

For affording flow communication between the working chambers 35 and 36 in operation of the damper, displacement ports 50 extend angularly through the piston member 33 from the working chamber 35 to an interior annular distribution channel 51 provided in the interior periphery of the piston 33. The piston rod 30 has a reduced end portion 54 extending centrally through the piston 33 and provided with a radially extending passage 55 communicating with channel 51. A sleeve 57 fits into the open end of the piston reduced end portion 54 and abuts against an internal shoulder 58 of the piston rod 30. This sleeve 57 has a port 60 registering with the passage 55 and communicating with the interior space 62 of the sleeve 57. The sleeve is secured in place in the piston 30 by means of a screw 63. A valve plug 65 is rotatably disposed within the sleeve 57 and has an interior passage opening into the space 62 provided by the sleeve for communication with the ports 55 and 60. The interior chamber of the plug 65 is intersected at one side thereof by a relatively wide peripheral slot 70 registering with a metering slit 71 in the sleeve 57. The metering slit 71 communicates with the working chamber 36 through a port 74 extending through the piston rod 30.

By turning the valve member 65, it will be appreciated that the area of the metering slit 70 can be restricted by increments to increase the resistance to displacement of hydraulic fluid between the working chambers, as desired. There is thus provided a variable displacement control orifice.

Means for effecting adjustments of the orifice valve 65 comprise a stem 81 projecting axially through an axial bore 83 in the piston rod 30. At its outer end, the stem 81 is exposed within an outwardly opening counterbored recess in the outer extremity of the piston rod 30. For turning the stem 81, a transverse handle pin 86 is provided which may also serve as an index pointer. Any adjusted condition of the valve is maintained by means of a lock nut 87 which is threaded onto the outer extremity portion of the stem 81 and in locked condition drives the pointer 86 clampingly against bearing journal 90 for the stem. After the desired adjustment has been effected and the lock nut 87 screwed down tight, a positive closure cap 91 is threaded into the recess in the end of the piston rod 30. The bracket portion 31 may be welded to the end of the piston rod 30 as indicated at 95.

In order to compensate for the great variation in temperature encountered in the service of the flutter damper in an airplane, automatic thermostatic adjustment means are provided to effect compensations in the adjustment of the orifice valve 65. For this purpose a spiral thermostatic element 96 is connected between the valve member 65 and the stem 81 so that while the stem 81 is secured in fixed primary adjusted condition, the thermostatic element 96 will operate to close the orifice from a mean temperature rated adjustment when the temperature increases and thereby the viscosity of the fluid is lowered, and to open the fluid displacement orifice when the temperature decreases below the mean rated adjustment and the viscosity of the fluid increases.

For maintaining the piston rod displacement constant, a piston extension member 100 of the same exterior diameter as the piston rod 30 is threadedly engaged with the reduced end portion 54 of the piston rod to extend from the opposite end of the piston member 33 and thus to displace an amount of liquid in the working chamber 35 equal to the volume of liquid displaced in the working chamber 36 by the piston rod 30. Thus the piston rod displacement is not a function of piston position, and consequently during operation there is no surge in the replenishing chamber (to be hereinafter described) due to variable piston rod displacement. The piston rod extension 100 is guided by means of a sleeve 101 which has an enlarged end portion 102 fitting within the internal flange 45 of the housing and sealed thereto by means of O-ring 104. The piston extension 100 is sealed relative to the sleeve 101 by means of an O-ring 105. It will thus be seen that the piston member 33 is supported in the casing by means of the piston rod 30 and piston rod extension 100 which are slidably guided by means of the plug 40 and sleeve 101, respectively, so that there is no tendency for the piston member 33 to rest on the lower surface of the casing 17. Frictional forces between the piston member 33 and the interior surface of the casing 17 are thus distributed around the entire periphery of the piston member. It will be observed in Figure 2 that bracket portion 106 mounting the bracket means 22 by means of the shaft 23 is clamped to the end of the casing 17 by means of a cap 107 and that the sleeve 101 is threaded onto a portion 108 of the bracket 106 to center the sleeve 101 axially of the casing 17.

It is extremely important for efficient functioning of the flutter damper that the working chambers 35 and 36 remain at all times thoroughly filled with hydraulic fluid. Accordingly, means are provided for maintaining the working chambers continuously supplied with hydraulic fluid under a replenishing pressure head. To this end, the casing 17 is provided at its upper forward end with a pressurized replenishing chamber 110 defined between the flange 45 and a secondary movable piston 111 slidable in an upper cylindrical end portion 113 of the casing 17. The replenishing chamber 110 communicates with the working chamber 35 by means of a replenishing passage 115 extending through the flange 45 and controlled against escape of hydraulic fluid from the working chamber 35 by means of a ball check valve 116. For supplying replenishing fluid to the remote working chamber 36, a fitting 118, Figure 3, extends into communication with the replenishing chamber 110 closely adjacent the flange 45 in the manner indicated in Figure 4 for the air bleeder fitting to be hereinafter described. A fluid duct 119 connects the fitting 118 with a fitting 120 connecting with the lower remote end of the casing 17. As indicated in Figure 2, the fitting 120 is threadedly engaged with the plug 40 at the lower end of the casing and communicates with the remote working chamber 36 by means of a passage 122 under the control of a check valve 123.

Similarly, air bleeder passages communicate with the replenishing chamber from the upper portions of the respective working chambers, a direct passage through the flange 45 being indicated at 115' for bleeding air from the working chamber 35 with means indicated at 117 preventing leakage of fluid. The element 117 in Figure 2 threads into the enlarged end of the passage 115' to substantially prevent flow of liquid while accommodating a bleed off of air to the passage 115', the air leaking along a groove at the top of the enlarged end of passage 115' and about the rear margin of the element 117. For bleeding air from the remote working chamber 36, a very small passage indicated at 120' extends around the plug 40 from the chamber 36 and axially to a radial passage 121 in the plug 40 which in turn communicates with an axial bore 124 connecting with a fitting 125 having tubing 126 connecting with a fitting 127 opening into the replenishing chamber as indicated in Figure 4 by means of a passage 128 between the edge of the flange 45 and the adjacent wall of the fitting 127. A closure plug or cap 130 is provided at the upper part of the casing 17 for communication with the replenishing chamber 110 at the top thereof to bleed off any air which may accumulate in the replenishing chamber.

For providing a suitable pressure in the replenishment chamber 110, the piston 111 is urged toward the wall portion 45 by means of a pair of springs 143 and 144 which are disposed in the chamber in surrounding relation to the sleeve 101. The springs are bottomed against a peripheral flange 145 of the bracket means 106. An aperture 149 is provided in the wall of the casing portion 113 and is covered by a closure plate member 152. Removal of the closure plate 152 exposes a sleeve 154 which is connected with the piston 111. The sleeve 154 preferably has suitable gauge markings longitudinally spaced therealong which are visible through the aperture 149 when the closure plate member is removed. The gauge markings thus serve to indicate the location of the piston 111 so that the condition of the replenishing chamber can be ascertained by reference thereto. Suitable O-rings 157 and 158 are provided on the interior and exterior periphery of the piston member 111 to prevent leakage from the replenishing chamber 110.

As indicated in Figure 3, a replenishment valve 160 is provided for accommodating refill of the replenishment chamber 110 as required. The valve is placed in a bore 161 which communicates by means of a passage 162 to the replenishing chamber. The valve comprises a valve body portion 164 having a passage 168 controlled by means of a resilient check valve block 165 which is resiliently urged by means of a spring (not shown) seated against the spider 167 and urging the block 165 into seating relation. To fill the replenishing chamber, the plug 170 is removed from the bore 161 along with its sealing ring 171 and oil under pressure is forced into the passage 168 and past the block 165 against the action of the spring.

The operation of the damper will be readily understood from the foregoing description. As the control member 18 in Figure 1 tends to vibrate about its pivot axis relative to the body 19, a resultant oscillation of the lever 20 is resisted by means of the damper construction 15. Specifically, if there is a vibrational force tending to suddenly move the piston rod 30 to the left as seen in Figure 2, the hydraulic fluid in the working chamber 35 resists such movement, while sudden movement to the right is resisted by the fluid in the working chamber 36 acting against the piston 33. Normal intentional adjustments of the control member 18 relative to the body 19 are accommodated by the metered flow of fluid, for example, from the working chamber 35 to chamber 36 through the passage 50, ports 55 and 60, to chamber 62 and from the chamber 62 out through the metering slit 71 and the port 74 under the control of the valve plug 65. The replenishing chamber 110 is operative to feed fluid to the working chamber 35 through the check valve passage 115 and to the working chamber 36 through the tubing 119 and fitting 120 at the remote end of the casing through check valve passage 122. Any air in the working chambers will be forced through the bleed passage 115' for working chamber 35, and through bleed passages 120', 121 and 124 to the tubing 126 and into the replenishing chamber 110 through the passage 128 indicated in Figure 4 for chamber 36.

During filling of the unit with hydraulic fluid, the air bleed plug 130 is loosened so that air can escape from the interior of the unit. When the hydraulic fluid introduced through the valve 160, Figure 3, has filled the working chambers and shows at the air bleed vent, the plug 130 is tightened to seal the vent.

It will be understood that modifications and variations may be effected without departing from the scope of the novel concepts of the present invention.

We claim as our invention:

1. A hydraulic apparatus comprising a housing having an interior space, first and second wall members defining opposite ends of said space, a piston member reciprocal in said space and dividing the space into separate working chambers, a piston stem projecting into said housing through said first wall member, a piston extension of exterior cross section substantially equal to the exterior cross section of said piston stem extending through said second wall member and connected to said piston member, a sleeve member extending from said second wall member within said housing and receiving said piston extension in sliding relation to the interior surface thereof, said sleeve member and said housing having an annular space therebetween, an annular piston member in said space and slidable on said sleeve member to provide a replenishing chamber between said annular piston member and said second wall member, compression spring means encircling said sleeve member and acting on said annular piston member to urge the same toward said second wall member, said second wall member having a replenishing duct affording communication between said replenishing chamber and the working chamber adjacent thereto, a one-way valve in said replenishing duct preventing flow of fluid from said adjacent working chamber to said replenishing chamber, and said wall member having an air bleed duct at the top thereof affording communication between said adjacent working chamber and said replenishing chamber to bleed air from said adjacent work chamber.

2. A hydraulic apparatus comprising a housing having an interior space, first and second wall members defining opposite ends of said space, a piston member reciprocal in said space and dividing the space into separate working chambers, a piston stem projecting into said housing through said first wall member, a piston extension of exterior cross section substantially equal to the exterior cross section of said piston stem extending through said second wall member and connected to said piston member, a sleeve member extending from said second wall member within said housing and receiving said piston extension in sliding relation to the interior surface thereof, said sleeve member and said housing having an annular space therebetween, an annular piston member in said space and slidable on said sleeve member to provide a replenishing chamber between said annular piston member and said second wall member, compression spring means encircling said sleeve member and acting on said annular piston member to urge the same toward said second wall member, said second wall member having a replenishing duct affording communication between said replenishing chamber and the working chamber adjacent thereto, a one-way valve in said replenishing duct preventing flow of fluid from said adjacent working chamber to said replenishing chamber, and said wall member having an air bleed duct at the top thereof affording communication between said adjacent working chamber and said replenishing chamber to bleed air from said adjacent work chamber, said first wall member having a replenishing duct therein leading into the working chamber adjacent thereto, a pipe connecting said replenishing chamber with said replenishing duct in said first wall member, a one-way valve in said first wall member controlling flow of fluid in said replenishing duct and preventing flow of fluid from the working chamber adjacent said first wall member to said replenishing chamber, and a further pipe affording an air bleed connection between the working chamber adjacent said first wall member and said replenishing chamber.

References Cited in the file of this patent

UNITED STATES PATENTS

| | | |
|---|---|---|
| 1,072,350 | Muller | Sept. 2, 1913 |
| 1,434,197 | Brown | Oct. 31, 1922 |
| 1,825,233 | Joyce | Sept. 29, 1931 |
| 2,334,115 | Meredith | Nov. 9, 1943 |
| 2,342,381 | Thornhill | Feb. 22, 1944 |
| 2,410,176 | Magrum | Oct. 29, 1946 |
| 2,419,651 | Magrum | Apr. 29, 1947 |
| 2,664,255 | Crandall et al. | Dec. 29, 1953 |

FOREIGN PATENTS

| | | |
|---|---|---|
| 299,670 | Great Britain | Nov. 1, 1928 |